United States Patent
Wang et al.

(10) Patent No.: US 10,616,922 B2
(45) Date of Patent: Apr. 7, 2020

(54) METHOD AND APPARATUS FOR TRANSMITTING DATA

(71) Applicant: Samsung Electronics Co., Ltd., Gyeonggi-do (KR)

(72) Inventors: Yi Wang, Beijing (CN); Chengjun Sun, Beijing (CN); Yingyang Li, Beijing (CN)

(73) Assignee: Samsung Electronics Co., Ltd. (KR)

( * ) Notice: Subject to any disclaimer, the term of this patent is extended or adjusted under 35 U.S.C. 154(b) by 26 days.

(21) Appl. No.: 15/525,132

(22) PCT Filed: Nov. 9, 2015

(86) PCT No.: PCT/KR2015/011989
§ 371 (c)(1),
(2) Date: May 8, 2017

(87) PCT Pub. No.: WO2016/072815
PCT Pub. Date: May 12, 2016

(65) Prior Publication Data
US 2018/0279365 A1   Sep. 27, 2018

(30) Foreign Application Priority Data

Nov. 7, 2014   (CN) .......................... 2014 1 0643819
Dec. 17, 2014   (CN) .......................... 2014 1 0785114
Apr. 8, 2015   (CN) .......................... 2015 1 0163387

(51) Int. Cl.
*H04W 52/36* (2009.01)
*H04W 16/14* (2009.01)
(Continued)

(52) U.S. Cl.
CPC ....... *H04W 74/0808* (2013.01); *H04W 16/14* (2013.01); *H04W 52/143* (2013.01); *H04W 52/367* (2013.01)

(58) Field of Classification Search
CPC ..... H04W 16/14; H04W 24/10; H04W 72/04; H04W 72/0446; H04W 72/0453; H04W 74/006; H04W 52/143
See application file for complete search history.

(56) References Cited

U.S. PATENT DOCUMENTS

2007/0242621 A1   10/2007   Nandagopalan et al.
2010/0172319 A1   7/2010   Shimobayashi
(Continued)

FOREIGN PATENT DOCUMENTS

CN   101352055   1/2009
WO   WO 2014/111309   7/2014
WO   WO 2014/148818   9/2014

OTHER PUBLICATIONS

PCT/ISA/210 Search Report issued on PCT/KR2015/011989 (pp. 3).

(Continued)

Primary Examiner — Raj Jain
(74) Attorney, Agent, or Firm — The Farrell Law Firm, P.C.

(57) ABSTRACT

Provided is a pre-5th-Generation (5G) or 5G communication system for supporting higher data rates Beyond 4th-Generation (4G) communication system such as Long Term Evolution (LTE). The present disclosure provides a method for transmitting data, including: performing, by a Long-Term Evolution (LTE) equipment, Clear Channel Assessment (CCA) in one channel of a unlicensed band; and determining, by the LTE equipment, whether the channel can be occupied according to a CCA measurement value in the channel, and determining a data transmission parameter if it is determined that the channel can be occupied. The present disclosure also provides a corresponding apparatus. According to the method and apparatus provided by the present disclosure, the transmission power of the apparatus on the (Continued)

unlicensed band may be controlled, channel seizing opportunity is increased and effective coexistence is ensured.

16 Claims, 4 Drawing Sheets

(51) Int. Cl.
*H04W 52/14* (2009.01)
*H04W 74/08* (2009.01)

(56) References Cited

U.S. PATENT DOCUMENTS

| | | |
|---|---|---|
| 2014/0031054 A1 | 1/2014 | Zou et al. |
| 2014/0254510 A1 | 9/2014 | Porat |
| 2017/0202019 A1* | 7/2017 | You .................. H04W 16/14 |
| 2017/0347270 A1* | 11/2017 | Iouchi .................. H04W 16/14 |

OTHER PUBLICATIONS

PCT/ISA/237 Written Opinion issued on PCT/KR2015/011989 (pp. 8).
Chinese Office Action dated Apr. 23, 2019 issued in counterpart application No. 201510163387.7, 14 pages.

\* cited by examiner

[Fig. 1]
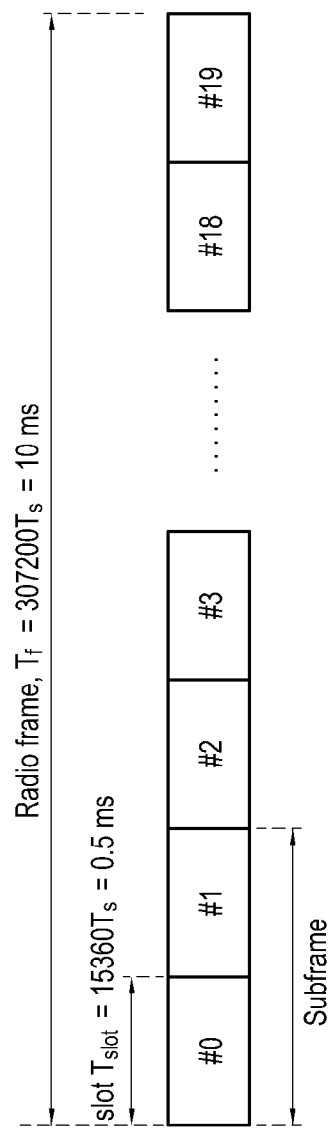

[Fig. 2]
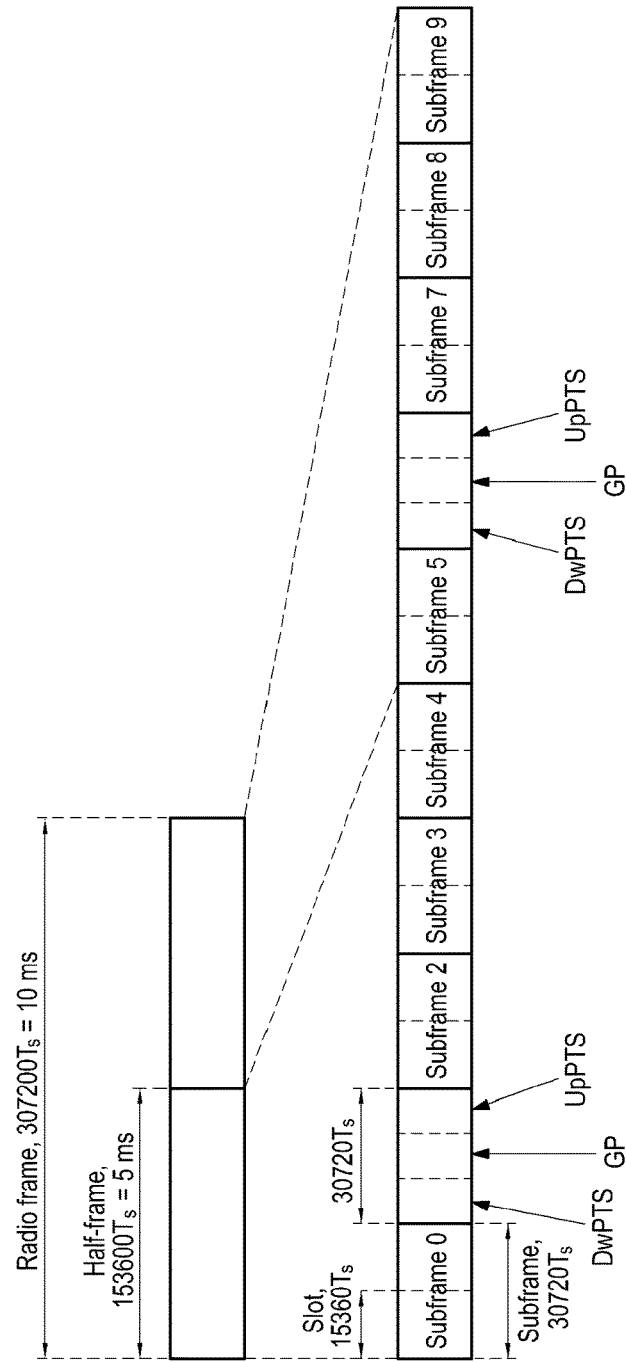
[Fig. 3]
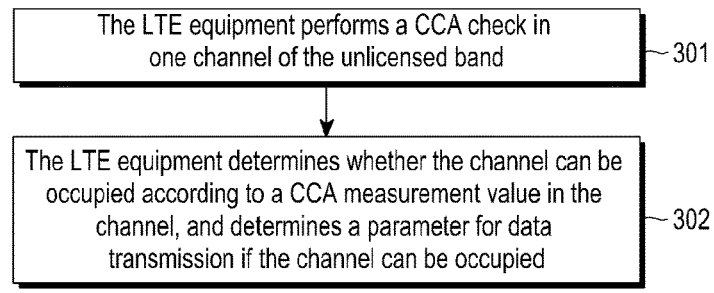

[Fig. 4]
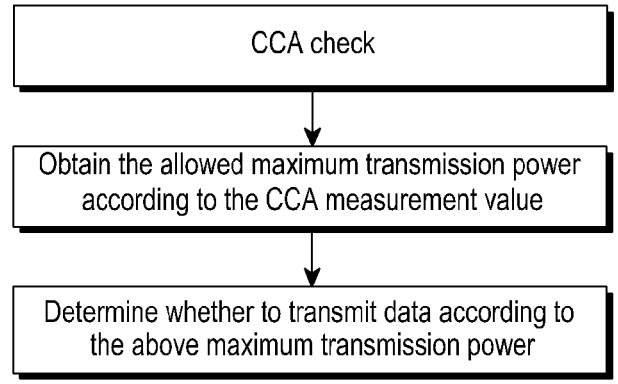
[Fig. 5]
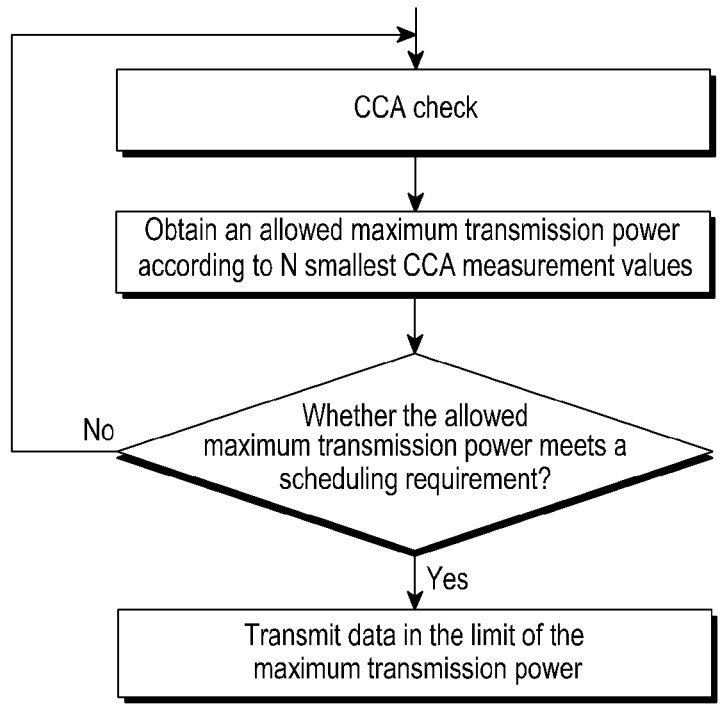
[Fig. 6]
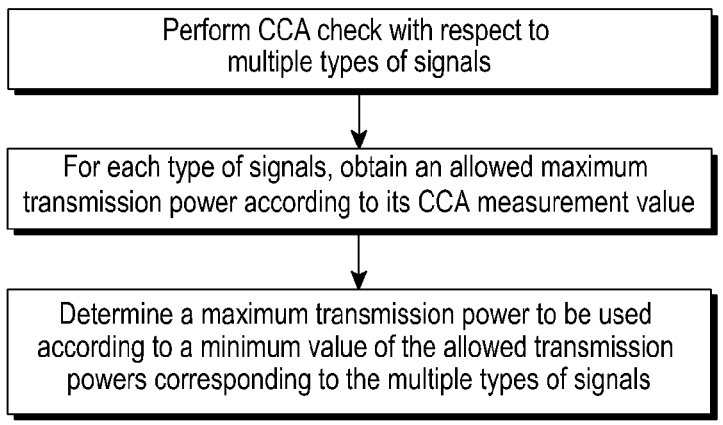

[Fig. 7]
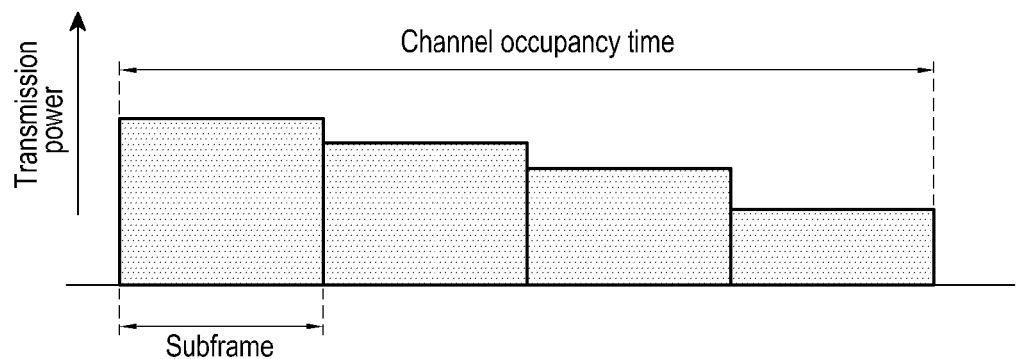
[Fig. 8]
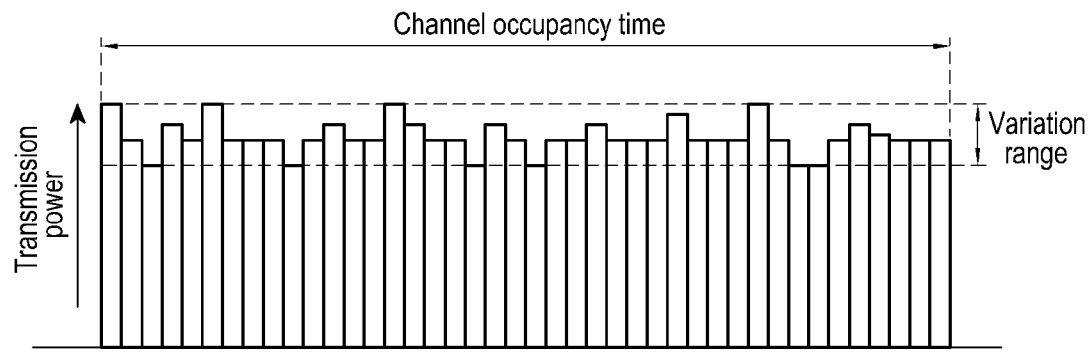
[Fig. 9]
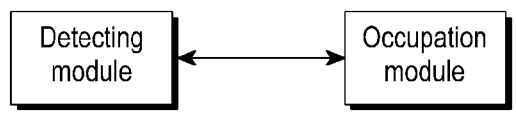

METHOD AND APPARATUS FOR TRANSMITTING DATA

PRIORITY

The application is a National Phase Entry of International Patent Application No. PCT/KR2015/011989, which was filed on Nov. 9, 2015, and claims priority to Chinese Patent Applications No. 201410643819.X, 201410785114.1, and 201510163387.7 filed on Nov. 7, 2014, Dec. 17, 2014 and Apr. 8, 2015, respectively, the contents of each of which are incorporated herein by reference.

TECHNICAL FIELD

The present disclosure relates to wireless communication techniques, and more particularly, to a method and apparatus for transmitting data on an unlicensed band based on a Long-Term Evolution (LTE) system.

BACKGROUND ART

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Long-Term Evolution (LTE) system of 3rd Generation Partnership Project (3GPP) supports two duplex modes including Frequency Division Duplex (FDD) and Time Division Duplex (TDD).

As shown in FIG. 1 which shows an existing FDD radio frame structure, for the FDD system, each radio frame is of 10 ms length, consists of ten 1 ms subframes. Each subframe consists of two consecutive 0.5 ms slots, i.e., the kth subframe includes slot 2k and slot 2k+1, k=0, 1, ..., 9.

As shown in FIG. 2 which shows an existing TDD radio frame structure, for the TDD system, each 10 ms radio frame is divided into two 5 ms half-frames. Each half-frame includes eight 0.5 ms subframes and three special fields, i.e., downlink pilot slot (DwPTS), guard period (GP) and uplink pilot slot (UpPTS). The total length of the three special fields is 1 ms. Each subframe consists of two consecutive slots, i.e., the kth subframe includes slots 2k and slot 2k+1, k=0, 1, ..., 9. One downlink Transmission Time Interval (TTI) is defined in one subframe.

When the TDD radio frame is configured, 7 kinds of uplink-downlink configurations are supported, as shown in Table 1. Herein, D denotes downlink subframe, U denotes uplink subframe, and S denotes a special subframe including the above three special fields.

Table 1 uplink-downlink configurations of LTE TDD.

TABLE 1

| Config-uration index | Switching point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

First n Orthogonal Frequency Division Multiplexing (OFDM) symbols of each downlink subframe may be used for transmitting downlink control information. The downlink control information includes Physical Downlink Control Channel (PDCCH) and other control information, wherein n=0, 1, 2, 3 or 4; remaining OFDM symbols may be used for transmitting Physical Downlink Shared Channel (PDSCH) or Enhanced PDCCH (EPDCCH). In the LTE system, PDCCH and EPDCCH are used for bearing Downlink Control Information (DCI) allocating uplink channel resources or downlink channel resources, respectively referred to as Downlink Grant (DL Grant) and Uplink Grant (UP Grant). In the LTE system, the DCI of different UEs are transmitted independently, and the DL Grant and the UL Grant are also transmitted independently.

In enhanced system of the LTE system, a wider working bandwidth is obtained through combining multiple Component Carriers (CC), i.e., Carrier Aggregation (CA), to form downlink and uplink of the communication system and therefore support higher transmission rate. Herein, the aggregated CCs may have the same duplex mode, e.g., all of them are FDD cells or TDD cells. The aggregated CCs may also have different duplex modes, i.e., there exist FDD cells and TDD cells at the same time. For one UE, a base station may configure it to work in multiple cells, one of them is a primary cell (PCell) and others are secondary cells (SCell). For the LTE CA system, transmission of the Hybrid Automatic Repeat Request-Acknowledgement (HARQ-ACK) and Channel State Information (CSI) on the Physical Uplink Control Channel (PUCCH) are only implemented on the Pcell.

The above LTE system is usually deployed on a licensed band, so as to avoid interferences from other systems. Besides the licensed band, there are also unlicensed bands. The unlicensed bands generally have been allocated for other usages, e.g., radar system and/or 802.11 series WiFi system. The 802.11 series WiFi system operates based on Carrier Sense Multiple Access with Collision Avoidance (CSMA/CA). Before transmitting signals, a Station (STA) needs to sense the wireless channel. The wireless channel can be occupied for transmitting signals only when it has been idle for a specified time period. The STA may determine the status of the wireless channel according to two mechanisms in association. On the one hand, the STA may practically sense the wireless channel using the carrier sensing technique. If signals of another STA are detected or perceived signal power is higher than a predefined threshold, it is determined that the wireless channel is busy. At this time, a physical layer module of the STA may report a Clear Channel Assessment (CCA) report to a higher layer module indicating that the wireless channel is busy. On the other hand, a virtual carrier sensing technique is also introduced in the 802.11 series WiFi system, i.e. Network Allocation Vector (NAV). Each 802.11 frame includes a duration field. The STA may determine whether it can transmit signal in the wireless channel according to a NAV value in the duration field, wherein the NAV indicates the amount of time that the wireless channel needs to be reserved.

For the LTE system, in order to meet the increasing demand of the mobile communication services, more spectrum resources need to be explored. One possible solution is to deploy the LTE system on the unlicensed band. Since the unlicensed band have generally been allocated for other usages, the interference level may be unpredictable when the LTE system is deployed on the unlicensed band, which makes it difficult to ensure Quality of Service (QoS) of data transmission of the LTE system. But the unlicensed band still can be used for data transmission with low QoS requirement. In this situation, how to avoid the interference to the LTE system on the unlicensed band has become an urgent problem to be solved.

DISCLOSURE

Technical Problem

The present disclosure provides a method and an apparatus for transmitting data on a unlicensed band based on a Long-Term Evolution (LTE) system, so as to control a transmission power of an equipment on the unlicensed band, increase channel seizing opportunity and ensure effective coexistence.

Technical Solution

The method for transmitting data provided by the present disclosure includes: performing, by a base station, clear channel assessment (CCA) in a channel of a unlicensed band; determining, by the base station, whether the channel being occupied according to a CCA measurement value in the channel; and determining, by the base station, a data transmission parameter based on the whether the channel being occupied.

In one embodiment, the determining the data transmission parameter further comprises: taking obtaining the CCA measurement value as a first CCA threshold level; and obtaining a maximum transmission power allowed during a next channel occupancy time according to a relationship between the CCA measurement value and the maximum transmission power.

In one embodiment, the determining whether the channel being occupied further comprises: the allowed maximum transmission power by comparing the CCA measurement value with a second CCA threshold.

In one embodiment, the performing the CCA further comprises: performing, by the base station, a CCA check; and recording, by the base station, CCA measurement values, and wherein the determining the data transmission parameter further comprises: obtaining a maximum value among N smallest CCA measurement values as a first CCA threshold level according to the recorded CCA measurement values, and obtaining a maximum transmission power allowed during a next channel occupancy time according to a relationship between the first CCA threshold level and the maximum transmission power.

In one embodiment, performing the CCA further comprise: if the CCA measurement value is equal to or higher than a second CCA threshold level, not recording the CCA measurement value.

In one embodiment, the performing the CCA further comprises: detecting CCA measurement values of at least two types of signals, wherein the determining the data transmission parameter further comprises: obtaining the CCA measurement value of each type of signals as a first CCA threshold level, and determining an allowed maximum transmission power according to a relationship between the first CCA threshold value and the maximum transmission power, wherein the maximum transmission power is a minimum value of the allowed maximum transmission powers of the at least two types of signals.

In one embodiment, the CCA measurement values of the at least two types of signals further comprise: an energy density of recognizable signals from an communication system and an energy density of other signals; or the CCA measurement values of the at least two types of signals comprise: energy of recognizable signals from an communication system of the same operator with the base station, energy of recognizable signals from an communication system of an operator different from the base station, and energy of other signals.

In one embodiment, the allowed maximum transmission power is, a maximum value of transmission powers on orthogonal frequency division multiplexing (OFDM) symbols or single carrier frequency division multiple access (SCFDMA) symbols in the channel occupancy time; or ta maximum value of average transmission powers of subframes in the channel occupancy time; or a maximum value of an instant transmission power in the channel occupancy time.

In one embodiment, if the CCA measurement value is lower than a CCA threshold value, occupying, by the base station, the channel to transmit the signals of a type, wherein the CCA threshold level is determined according to the type of signals to be transmitted in the channel.

In one embodiment, data transmission parameter comprise a transmission power on each OFDM symbol or an average transmission power of each subframe, and wherein the transmission power on each OFDM symbol is unchanged or decreases with time, in one channel occupancy time; or wherein the average transmission power of each subframe is unchanged or decreases with time, in one channel occupancy time.

In one embodiment, wherein the transmission powers on OFDM symbols in one subframe have a difference within a configured first range.

In one embodiment, average transmission powers of subframes have a difference within a configured second range.

In one embodiment, the method further includes: obtaining a power boosting proportion of a physical downlink shared channel (PDSCH) in OFDM symbols containing zero power channel state indication-reference signal (ZP CSI-RS) according to a configuration of higher layer signaling; or calculating, by a UE, a power boosting proportion of a PDSCH on physical resource blocks (PRBs) allocated to the UE according to a ZP CSI-RS configuration.

In one embodiment, the method further includes: transmitting, by the base station, dummy signals.

In one embodiment, Energy Per Resource Element EPRE of the dummy signals is equal to or lower than a minimum EPRE on effective PRBs.

In one embodiment, in one PRB pair containing the dummy signals, a Demodulation Reference Signal DMRS sequence is defined in advance or configured to a Network-Assisted Interference Cancelation and Suppression NAIC-SUE via higher layer signaling.

In one embodiment, if dedicated DMRS is configured for the dummy signals, $n_{scid}$ is an integer except for 0, 1 and 2.

In one embodiment, in one PRB pair containing the dummy signals, a Quarter Phase Shift Keying QPSK modulation manner is adopted for data Resource Elements REs of the PDSCH, wherein QPSK modulation symbol born by each RE is random; or a known QPSK sequence is transmitted on each RE of the PRB.

In one embodiment, in one PRB pair containing the dummy signals, the dummy signals of a single antenna port are transmitted.

In one embodiment, for a transmission mode based on Cell-specific Reference Signal CRS, a precoding matrix of the dummy signals is defined in advance or configured by higher layer signaling.

In one embodiment, for a transmission mode based on CRS, the dummy signals are transmitted using a minimum power control parameter PA, wherein the PA is defined in advance or configured by higher layer signaling.

The present disclosure further provides a base station for transmitting data, including: a transmitter configured to transmit the data; and at least one processor configured to: perform a CCA in one channel of a unlicensed band, and determine whether the channel being occupied according to a CCA measurement value in the channel, and determine a data transmission parameter based on the whether the channel being occupied.

In one embodiment, at least one processor further configured to: obtain the CCA measurement value as a first CCA threshold level, and obtain a maximum transmission power allowed during a next channel occupancy time according to a relationship between the CCA measurement value and the maximum transmission power.

In one embodiment, at least one processor further configured to: calculate the allowed maximum transmission power by comparing the CCA measurement value with a second CCA threshold.

In one embodiment, at least one processor further configured to: perform a CCA check, and record CCA measurement values, and obtain a maximum value among N smallest CCA measurement values as a first CCA threshold level according to the recorded CCA measurement values, and obtain a maximum transmission power allowed during a next channel occupancy time according to a relationship between the first CCA threshold level and the maximum transmission power.

In one embodiment, at least one processor further configured to: if the CCA measurement value is equal to or higher than a second CCA threshold level, not record the CCA measurement value.

In one embodiment, at least one processor further configured to: detect CCA measurement values of at least two types of signals, and obtain the CCA measurement value of each type of signals as a first CCA threshold level, and determine an allowed maximum transmission power according to a relationship between the first CCA threshold value and the maximum transmission power, wherein the maximum transmission power is a minimum value of the allowed maximum transmission powers of the at least two types of signals.

In view of the above technical solution, in the method and apparatus for transmitting data provided by the present disclosure, the LTE equipment performs a CCA in the channel of the unlicensed band, and determines whether the channel can be occupied according to a CCA measurement value in the channel, and determines a data transmission parameter if it is determined that the channel can be occupied. Thus, the transmission power of the equipment can be controlled on the unlicensed band, the channel seizing opportunity is increased and the effective coexistence is ensured.

DESCRIPTION OF DRAWINGS

FIG. 1 is a schematic diagram illustrating an LTE FDD frame structure according to the prior art.

FIG. 2 is a schematic diagram illustrating an LTE TDD frame structure according to the prior art.

FIG. 3 is a flowchart illustrating a method for transmitting data on the unlicensed band by an LTE equipment according to an embodiment of the present disclosure.

FIG. 4 is a flowchart illustrating a first method for determining an allowed maximum transmission power according to an embodiment of the present disclosure.

FIG. 5 is a flowchart illustrating a second method for determining the allowed maximum transmission power according to embodiment of the present disclosure.

FIG. 6 is a schematic diagram illustrating a process of determining the allowed maximum transmission power according to multiple CCA measurement values according to an embodiment of the present disclosure.

FIG. 7 is a first schematic diagram illustrating transmission power during one channel occupation time according to an embodiment of the present disclosure.

FIG. 8 is a second schematic diagram illustrating the transmission power during one channel occupation time according to an embodiment of the present disclosure.

FIG. 9 is a schematic diagram illustrating a structure of an apparatus for transmitting data according to an embodiment of the present disclosure.

MODE FOR INVENTION

The present disclosure is described in further detail hereinafter with reference to accompanying drawings and embodiments to make the objective, technical solution and merits therein clearer.

On the unlicensed band, other wireless communication system may be deployed, e.g. radar, WiFi, etc. Therefore, when deploying the LTE system on the unlicensed band, interferences between the LTE system and the above other wireless system should be avoided. In order to avoid the interferences with other LTE equipment or equipment of the other wireless system, the LTE equipment shall observe the status of the channel prior to transmit signals. The channel can only be occupied for data transmission when it is idle. For facilitating the description, the LTE equipment hereinafter refers to a base station or a UE in the LTE system. On the unlicensed band, the interferences from the other wireless communication system are out of control. Therefore, it is hard to ensure the QoS. In the present disclosure, the UE may operate in the CA mode, wherein the PCell of the UE is a cell on the licensed band and used for ensuring the QoS of the UE.

FIG. 3 is a flowchart illustrating a method for transmitting data on an unlicensed band by an LTE equipment according to an embodiment of the present disclosure. The method includes the following.

At block 301, the LTE equipment performs a Clear Channel Assessment (CCA) in a channel of the unlicensed band.

The CCA may include measuring a signal total energy in the channel. Or, when the LTE equipment is able to recognize a particular signal sequence, the CCA may include measuring the energy of the signal sequence in the channel. The above signal sequence may identify signals from one wireless system. The LTE equipment may obtain status information about signals of multiple wireless systems utilizing the CCA, so as to implement subsequent data transmission according to detected signal type.

At block 302, the LTE equipment determines whether the channel can be occupied according to a CCA measurement value in the channel, and determines a data transmission parameter if the channel can be occupied.

Herein, since the LTE system adopts fixed frame structure, i.e., each subframe is of 1 ms length and has fixed start timing and end timing, whereas the time when the LTE equipment finds that the channel is idle is uncertain, the LTE equipment may need to transmit a signal used for occupying the channel before starting the data transmission, which is referred to as a preamble hereinafter. Besides occupying the channel, the preamble may have other functions, e.g., Automatic Gain Control (AGC), etc. If the LTE equipment does not transmit any signal before the timing position for transmitting data, the channel may be seized by other equipment on the unlicensed band.

Hereinafter the technical solution of the present disclosure is described in detail with reference to six embodiments.

Embodiment 1

On the unlicensed band, the equipment firstly detects the channel status, i.e., performs a CCA check. The channel can only be occupied when it is detected that the channel is idle or it has been detected for a certain number (the number may be random) of times that the channel is idle according to a further requirement. Herein, when a CCA measurement value is lower than a CCA threshold level, it may be regarded that the channel is idle; otherwise, it is regarded that the channel is occupied. If the requirement for occupying the channel is met, the channel occupancy time of the equipment may include one or more subframes.

According to European Regulations about the unlicensed band, there is a relationship between the CCA threshold level and a maximum transmission power PH of the equipment. For example, suppose that a receive antenna gain is 0 dBi, for a 23 dBm equivalent isotropically radiated power (e.i.r.p) transmitter, the CCA threshold level is −73 dBm/MHz. For other transmit power classes, suppose that the receive antenna gain is 0 dBi, the CCA threshold level is calculated using TL=−73 dBm/MHz+23−PH. According to the above formula, given the maximum transmission power, the CCA threshold level required by the Regulations may be derived. Or, given the CCA threshold level, the maximum transmission power allowed by the Regulations may be derived.

The LTE system supports uplink and downlink transmission power control, thus the transmission power of the base station and the UE are both adjustable. In particular:

For the downlink transmission of the LTE system, the eNB may control its downlink transmission power according to the channel status of each UE. For example, for transmission modes 1~6, the transmission power with respect to one UE may be controlled via semi-statically configured parameters PA and PB. For transmission modes 7~9, the downlink transmission power with respect to one UE may be adjusted dynamically since the data demodulation is based on DMRS. Since different UEs may be scheduled by the eNB in different downlink subframes, the total transmission power of different downlink subframes are generally different. Further, inside one subframe, different time-frequency resources may bear different types of information, therefore the transmission power of different OFDM symbols may also be different. For example, the transmission power of OFDM symbols where CRS exist and the transmission power of other OFDM symbols may be different. The transmission power of OFDM symbols where Zero Power Channel State Indication-Reference Signal (ZP CSI-RS) is applied and the transmission power of other OFDM symbols are also different. In view of the above, during one channel occupancy time period, the downlink transmission power of the LTE base station generally varies in different subframes or inside one subframe. In addition, for different channel occupancy time periods, the downlink transmission power of the LTE base station is also different.

For the uplink transmission of the LTE system, the UE may actively adjust the transmission power via open-loop power control, and the base station may control the transmission power of the UE via close-loop power control. In addition, in case that the power is restricted, the UE may adjust the transmission power of a component carrier according to a certain criteria. In one uplink subframe, the transmission power of the UE is also variable, e.g., PUSCH is transmitted at the start of the uplink subframe and SRS is transmitted on the last symbol. Thus, the uplink transmission power of the UE is also adjustable.

As described above, in one channel occupancy time period, the transmission power of the LTE equipment is fluctuate. And in different channel occupancy time periods, the transmission power of the LTE equipment may also be different. In the present disclosure, it is defined that a maximum transmission power is a maximum value of the transmission power in one channel occupancy time period. During one channel observation of the LTE equipment, the CCA measurement value is taken as a first CCA threshold level, and a current allowed maximum transmission power is obtained according to the relationship between the first CCA threshold level and the maximum transmission power. The above maximum transmission power may be a signal total power inputted by the equipment to the antenna, i.e., not including the antenna gain; or the maximum transmission power may refer to the e.i.r.p of the antenna, i.e., including the antenna gain.

For example, the maximum value of the transmission power is denoted by PH, the first CCA threshold level is TL, and the CCA measurement value is denoted by E. Thus, according to E=TL<=−73 dBm/MHz+23−PH, it may be obtained that PH=−73 dBm/MHz+23−E. The above maximum value of the transmission power may be the maximum value among the transmission powers of the OFDM symbols or SCFDMA symbols during channel occupancy time of the equipment, or a maximum value among average transmission powers of subframes of the equipment during the channel occupancy time, or a maximum value of an instant transmission power of the equipment during the channel occupancy time.

According to the above method, it is possible to calculate an allowed maximum transmission power corresponding to each CCA measurement value, and allow the equipment to occupy the channel with a transmission power not exceeding the allowed maximum transmission power. Or, the above method may be used to determine the allowed maximum transmission power only when the CCA measurement value is lower than a second CCA threshold level TL2, i.e., when the CCA measurement value is lower than TL2. At this time, the equipment can occupy the channel but the restriction of the allowed maximum transmission power must be complied with. When the CCA measurement value is equal to or higher than TL2, the equipment cannot occupy the channel. Herein, TL2 is the maximum value of the CCA measurement value that the channel is allowed to be occupied. Or, the above method may be used to determine the allowed maximum transmission power only when the CCA measurement value is higher than a third CCA threshold level TL3, i.e., when the CCA measurement value is higher than TL3. At this time, the equipment can occupy the channel but the restriction of the allowed maximum transmission power must be complied with. When the CCA measurement value is equal to or lower than TL3, the maximum transmission power is subject to the threshold TL3 and cannot exceed it. Herein, TL3 is to control the maximum transmission power that the equipment can use. Or, the thresholds TL2 and TL3 may be configured at the same time, and TL2>TL3, i.e., only when the CCA measurement value is lower than TL2 but higher than TL3, it is possible to determine the allowed maximum transmission power according to the above method. When the CCA measurement value is equal to or higher than TL2, the equipment cannot occupy the channel. When the CCA measurement value is equal to or lower than TL3, the maximum transmission power of the equipment is subject to threshold TL3 and cannot exceed it.

Suppose that the CCA check mechanism is: once it is found that the channel is idle, the equipment may occupy the channel. For example, according to the European Regulations, for a Frame Based Equipment (FBE), the channel status is observed at the start of each frame period, if the CCA observation indicates that the channel is idle, the equipment may occupy the channel during a next frame period. If the channel is occupied, the equipment cannot occupy the channel during a next frame period. As shown in FIG. 4, according to the above method, the maximum transmission power can be used by the equipment during the next frame period may be obtained according to the current CCA measurement value. According to this method, the equipment may further determine whether the allowed maximum transmission power meets its scheduling requirement. If it meets the scheduling requirement, the equipment occupies the channel and keeps its transmission power not exceeding the above allowed maximum transmission power. If it does not meet the scheduling requirement, the equipment may give up the occupation. For example, if the allowed maximum transmission power is relatively low, the base station may consider scheduling a UE with a better channel condition. For the uplink transmission of the UE, the UE may consider the impact of decreasing uplink transmission power.

Suppose that the CCA detect scheme is: if it has been detected for a certain number of times N (e.g., N is a random number) that the channel is idle, the equipment may occupy the channel. For example, according to the European Regulations, a Load Based Equipment (LBE) starts to observe the channel when it has a data transmission requirement. If the CCA check indicates that the channel is occupied, a random number N is generated and the equipment keeps on observing the channel. After N times of channel idle are observed, the channel can be occupied. Generally, when the equipment observes the channel, the CCA measurement value during each observation is different. Therefore, the allowed maximum transmission power obtained according to the CCA measurement value following the above method may also be different.

As shown in FIG. 5, in order to determine the maximum transmission power can be used by the equipment when occupying the channel, one method is to record each CCA measurement value and determine the allowed maximum transmission power according to a maximum value among N smallest CCA measurement values. Or, the equipment may only record N smallest CCA measurement values after it starts to observe the channel. In particular, after the equipment finishes a new CCA measurement, if the new CCA measurement value is larger than or equal to a maximum value of the above N smallest CCA measurement values, the new CCA measurement value is discarded. If the new CCA measurement value is smaller than the maximum value of the above N smallest CCA measurement values, the maximum value of the above N smallest CCA measurement values is discarded and the new CCA measurement value is recorded. The equipment may determine the allowed maximum transmission power according to a maximum value of the above N smallest CCA measurement values. If the allowed maximum transmission power is able to meet a data transmission requirement, the equipment occupies the channel and keeps its transmission power not exceeding the allowed maximum transmission power; otherwise the equipment may keep on with the CCA check of the channel until an allowed maximum transmission power determined according to the maximum value of the N smallest CCA measurement values is able to meet the data transmission requirement. According to the above method, if the above threshold TL2 is defined and the CCA measurement value is equal to or larger than TL2, the UE may directly proceed with subsequent CCA check instead of recording the CCA measurement value.

Or, the equipment may obtain a fourth CCA threshold level TL4 currently to be used according to a required maximum transmission power and the relationship between the maximum transmission power and the CCA threshold level. Thereafter, during the CCA check procedure, TL4 may be taken as a CCA threshold level to observe the channel. If the CCA indicates that the channel has been idle for N times, the equipment may occupy the channel and keeps its transmission power not exceeding the maximum transmission power used for determining the CCA threshold level.

Embodiment 2

On one channel of the unlicensed band, there may already exist signals of other LTE cells and/or other wireless systems. Therefore, when determining whether the channel can be occupied, an LTE equipment has to consider impact to the other LTE cells and/or other wireless systems and may adopt different processing manners with respect to the signals of other LTE cells and signals of other wireless systems. For example, different CCA threshold levels may be used with regard to different types of signals. The CCA measurement values of the different types of signals are denoted by $E_k$. For example, it is possible to differentiate energy densities $E_0$ and $E_1$ of the recognizable signals from the LTE system and the other signals; or, it is possible to differentiate energy densities $E_0$, $E_1$ and $E_2$ of the recognizable signals from the LTE system of the same operator, the recognizable signals from the LTE system of a different operator and other signals.

The method of embodiment 1 may be adopted to detect the CCA measurement values of the signals of different types. For each type of signals, an allowed maximum transmission power within the corresponding channel occupancy time may be determined according to its CCA measurement value. For example, for a CCA measurement value $E_k$ of a type of signals, the corresponding allowed maximum transmission power $PH_k$ is obtained using $PH_k=-73$ dBm/MHz+23−$E_k$. Thus, multiple allowed maximum transmission powers may be obtained with regards to the multiple types of signals. Thus, the maximum transmission power actually used by the equipment during the channel occupancy time may be a minimum value among the maximum transmission powers $PH_k$ corresponding to the multiple types of signals, i.e., min($PH_0$, . . . , $PH_k$).

For example, for the signals from the LTE system, the allowed maximum transmission power $PH_0$ of the LTE equipment may be obtained through taking the CCA measurement value $E_0$ as the CCA threshold level. For other signals, the allowed maximum transmission power $PH_1$ of the LTE equipment may be obtained through taking the CCA measurement value of the other signals as the CCA threshold level. Thus, the maximum transmission power that the LTE equipment may actually use may be the minimum value of the above two maximum transmission powers, i.e., min($PH_0$, $PH_1$).

For the signals from the LTE system of the same operator, the allowed maximum transmission power $PH_0$ of the LTE equipment may be obtained through taking the CCA measurement value $E_0$ of the signals as the CCA threshold level. For signals from an LTE system of another operator, the maximum transmission power $PH_1$ of the LTE equipment may be obtained through taking the CCA measurement value $E_1$ as the CCA threshold level. For signals from other systems, the allowed maximum transmission power $PH_2$ of the LTE equipment may be obtained through taking the CCA measurement value $E_2$ as the CCA threshold level. Thus, the maximum transmission power that the LTE equipment may actually use may be a minimum value of the above three maximum transmission powers, i.e., min($PH_0$, $PH_1$, $PH_2$).

Embodiment 3

On the unlicensed band, different functions may be implemented during one channel occupancy time period. Accordingly, the signals transmitted by the equipment may be different. Hereinafter, signals can be transmitted by the equipment during the channel occupancy time are described. The present disclosure is not limited to the following signals.

When the channel is occupied, the base station may transmit downlink data. According to the channel status and service condition of the UE currently being scheduled, the base station may need to transmit signals using a relatively high transmission power or even the maximum transmission power. Suppose that the base station still needs to transmit Discovery Reference Signal (DRS) on the unlicensed band to support RRM measurement of the UE. During one channel occupancy time period, if there is no downlink service, the base station may transmit merely the DRS. Herein functions of the DRS may be extended to support CSI measurement. In addition, on the unlicensed band, if signals dedicated for the CSI measurement are required to be transmitted, e.g. Non-Zero Power Channel State Indication-Reference Signal (NZP CSI-RS) signals which are transmitted to support channel measurement of the UE, the base station may transmit merely the NZP CSI-RS during the channel occupancy time if there is no downlink service. Both the DRS and the NZP CSI-RS do not occupy all subcarriers of the OFDM symbols. Therefore, the required transmission power is usually lower than the maximum transmission power of the base station. In the uplink direction, during one channel occupancy time period, the signals transmitted by the UE may be any one or any combination of uplink data (PUSCH), Sounding Reference Signal (SRS), Physical Random Access Channel (PRACH) signals and PUCCH which is used for feeding back Uplink Control Information (UCI), etc. When the UE needs to transmit uplink data, the UE may need to use a relatively high transmission power or even the maximum transmission power. When the UE does not transmit data, the actually required transmission power may be relatively low.

On the unlicensed band, the equipment has to detect the channel status firstly, i.e., performs the CCA check. The channel can be occupied by the equipment only when it is detected that the channel is idle or it has been detected for a certain number of times (the number may be a random number) that the channel is idle according to a further requirement. According to the method of embodiment 1, a certain relationship has to be met between the CCA threshold level and the maximum transmission power during the channel occupancy time, thus different CCA threshold levels may be adopted in different channel occupancy time periods and different maximum transmission powers may be used accordingly. According to the above analysis, on the unlicensed band, different functions may be implemented in different channel occupancy time periods and signals of different types may be transmitted by the equipment. In addition, the transmission power required by different types of signals may also be different. In the present disclosure, the CCA threshold level to be adopted may be determined according to the type of signals to be transmitted during the channel occupancy time. Thus, when the CCA measurement value is lower than the CCA threshold level, the equipment may occupy the channel and transmit the signals of the corresponding type. In particular, during one channel occupancy time, the signals transmitted by the equipment may be classified into N types according to the functions to be implemented, wherein N is larger than 1. For the kth type of signals, the CCA threshold level is configured as $TL_k$, wherein k=1, 2, . . . , N. There exists a relationship between the CCA threshold level corresponding to one type of signals and the transmission power to be adopted. For example, the maximum transmission power of a type of signals is denoted by $PH_k$, the CCA threshold level is $TL_k$, the CCA measurement value is denoted by $E_k$, then $E_k <= TL_k = -73$ dBm/MHz+23−$PH_k$.

Hereinafter one example is given to describe the above method of the present disclosure.

For the downlink direction, suppose that the signals in one channel occupancy time period are divided into three types, i.e., signals for transmitting downlink data, signals for transmitting merely DRS and signals for transmitting merely NZP CSI-RS. A CCA threshold level is configured for each type of signals respectively.

When downlink data is to be transmitted during one channel occupancy time period, since the transmission power of the base station may reach its maximum transmission power, a relatively low CCA threshold level $TL_1$ may be configured. For example, it is possible to define a relatively low CCA threshold level in advance; or use a CCA threshold level configured by higher layer signaling; or configure the CCA threshold level according to the maximum transmission power of the base station during the channel occupancy time; or configure the CCA threshold level according to the maximum transmission power defined by the power class of the base station.

If merely the DRS is to be transmitted during one channel occupancy time period, the required transmission power is relatively low. Therefore, a relatively high CCA threshold level $TL_2$ may be configured. For example, it is possible to define a relatively high CCA threshold level in advance; or use a CCA threshold level configured by higher layer signaling; or configure the CCA threshold level according to the maximum transmission power of the DRS during the channel occupancy time; or obtain the CCA threshold level for transmitting the DRS through adding a first offset to the CCA threshold level for transmitting the downlink data, wherein the first offset may be defined in advance or configured by higher layer signaling. In fact, the DRS consists of several kinds of component signals. It is possible to respectively configure a CCA threshold level for each component signal of the DRS, e.g., PSS/SSS, CRS and NZP CSI-RS. Thus it may be determined whether the corresponding DRS component signal can be transmitted according to the corresponding CCA threshold level.

Similarly, if merely the NZP CSI-RS is to be transmitted during one channel occupancy time period, the required transmission power is also relatively low. Therefore, another relatively high CCA threshold level $TL_3$ may be configured. For example, it is possible to configure another relatively high CCA threshold level, or use a CCA threshold level configured by higher layer signaling; or configure the CCA threshold level according to the maximum transmission power of the NZP CSI-RS in the channel occupancy time; or obtain the CCA threshold level for transmitting the NZP CSI-RS through adding a second offset to the CCA threshold level for transmitting the downlink data, wherein the second offset may be defined in advance or configured by higher layer signaling.

The above first offset and the second offset may be the same or different. The relationship between the CCA threshold levels $TL_2$ and $TL_3$ may be determined according to the levels of the transmission powers of the DRS and the NZP CSI-RS.

Similarly, for the uplink direction, suppose that the signals transmitted in one channel occupancy time period are classified into three types: signals for transmitting uplink data, signals for transmitting PRACH and signals for transmitting merely the SRS.

If uplink data is to be transmitted in one channel occupancy time period, since the transmission power of the UE may reach its maximum transmission power, a relatively low CCA threshold level $TL_4$ may be configured. For example, it is possible to predefine a relatively low CCA threshold level, or use a CCA threshold level configured by higher layer signaling; or configure a CCA threshold level according to the maximum transmission power of the UE during the channel occupancy time; or determine the CCA threshold level according to the maximum transmission power configured to the UE; or configure the CCA threshold level according to the maximum transmission power defined by a power class of the UE.

If merely the PRACH is to be transmitted during one channel occupancy time period, another CCA threshold level $TL_5$ may be configured. For example, it is possible to define another CCA threshold level in advance; or use a CCA threshold level configured by higher layer signaling; or configure the CCA threshold level according to the maximum transmission power of the PRACH during the channel occupancy time; or obtain the CCA threshold level for transmitting the PRACH through adding a third offset to the CCA threshold level for transmitting the uplink data, wherein the third offset may be defined in advance or configured by higher layer signaling. In particular, if the transmission power of the PRACH may vary with the transmission times of the PRACH, a different CCA threshold level may be configured for each PRACH transmission.

If merely the SRS is to be transmitted during one channel occupancy time period, another CCA threshold level $TL_6$ may be configured. For example, it is possible to define another CCA threshold level in advance, or use a CCA threshold level configured by higher layer signaling; or configure a CCA threshold level according to the maximum transmission power of the SRS during the channel occupancy time; or obtain a CCA threshold level for transmitting the SRS through adding a fourth offset to the CCA threshold level for transmitting the uplink data, wherein the fourth offset may be defined in advance or configured by higher layer signaling.

The third and fourth offsets may be the same or different. The relationship between the CCA threshold levels $TL_5$ and $LT_6$ may be determined according to levels of the transmission powers of the PRACH and the SRS.

Embodiment 4

The LTE system supports uplink and downlink transmission power control. Thus, the transmission powers of the base station and the UE are both adjustable. In particular:

For the downlink transmission of the LTE system, the eNB may control its downlink transmission power according to the channel status of each UE. For example, for transmission modes 1~6, the transmission power with respect to one UE may be controlled via semi-statically configured parameters PA and PB. For transmission modes 7~9, the downlink transmission power with respect to one UE may be adjusted dynamically since the data demodulation is based on DMRS. Since different UEs may be scheduled by the eNB in different downlink subframes, the total transmission power of different downlink subframes are generally different. Further, inside one subframe, different time-frequency resources may bear different types of information, therefore the transmission power of different OFDM symbols may also be different. For example, the transmission power of OFDM symbols where CRS exist and the transmission power of other OFDM symbols may be different. The transmission power of OFDM symbols where ZP CSI-RS is applied and the transmission power of other OFDM symbols are also different. In view of the above, during one channel occupancy time period, the downlink transmission power of the LTE base station generally varies in different subframes or inside one subframe. In addition, for different channel occupancy time periods, the downlink transmission power of the LTE base station is also different.

For the uplink transmission of the LTE system, the UE may actively adjust the transmission power via open-loop power control, and the base station may control the transmission power of the UE via close-loop power control. In addition, in case that the power is restricted, the UE may adjust the transmission power of a component carrier according to a certain criteria. In one uplink subframe, the transmission power of the UE is also variable. For example, PUSCH is transmitted at the start of one uplink subframe and SRS is transmitted on the last symbol. Thus, the uplink transmission power of the UE is also adjustable.

In one channel occupancy time period, the base station may transmit downlink data, or transmits merely the DRS, or transmits merely the reference signal used for CSI measurement. According to the above description, in one channel occupancy time period, the LTE equipment may transmit preamble at the start of the channel occupancy time. In one channel occupancy time period, the transmission power of the LTE equipment is fluctuate. The variation of the transmission power of the equipment actually affects the CCA check of other adjacent equipment. When the transmission power of the equipment is relatively high, equipment in a large area around the equipment may observe that the channel is occupied; whereas when the transmission power of the equipment is relatively low, merely equipment in a relatively small area around the equipment may observe that the channel is occupied. Suppose that during the channel occupancy time, the first equipment transmits data with a relatively low transmission power first. Thus the equipment at a certain distance from the first equipment may start to transmit signals since its CCA check indicates that the channel is idle. When the first equipment increases its transmission power during the latter part of the channel occupancy time, interference will be generated to the other equipment. In order to avoid this situation, the present disclosure provides a processing method. Hereinafter, the OFDM symbols refer to OFDM symbols of downlink subframes and SCFDMA symbols of uplink subframes.

In a first method, in one channel occupancy time period, it is required that the transmission power on each OFDM symbol is fixed or is decreased with time.

Since the transmission power on different OFDM symbols in one LTE subframe are usually different. In the second method, in one channel occupancy time period, it is required that the average transmission power of each subframe is fixed or is decreased with time. As shown in FIG. 6, in one channel occupancy time period, the average transmission power of each subframe is decreased with time. Herein, it may be further required that the difference between the transmission powers on different OFDM symbols in one subframe is within a certain range. The range of the difference between the transmission powers may be defined in advance by standards or configured by signaling or other methods.

In a third method, in one channel occupancy time period, the difference between the transmission powers on different OFDM symbols is required to be within a certain range. As shown in FIG. 7, in the LTE system, it may be not ensured that the transmission powers on all OFDM symbols are completely consistent. But it is possible to define that the difference between the transmission powers on different OFDM symbols has to be within a certain range. The range of the difference between the transmission powers may be defined by standards in advance, or configured by signaling or other methods.

In a fourth method, in one channel occupancy time period, it is required that the difference between the transmission powers on different OFDM symbols in one subframe is within a first range, and it is further required that a difference between the average transmission powers of different subframes during the channel occupancy time is within a second range. The above two ranges may be defined by standards in advance, or configured by signaling or other methods. In particular, the two ranges may be the same. Thus it is only required to configure one parameter for the variation range of the transmission powers.

In the above method, suppose that merely a part of a subframe is within the channel occupancy time. The average transmission power of the subframe refers to the average transmission power of the part within the channel occupancy time.

Embodiment 5

On a channel of the unlicensed band, in the CCA-based channel status detecting method, if the transmission power of the equipment may be kept unchanged during the channel occupancy time, it is more favorable for coexistence with other equipment.

For the downlink transmission of the LTE system, in order to increase the measurement accuracy ratio of the adjacent cell CSI-RS or to provide interference measurement resource (CSI-IM), ZP CSI-RS may be configured in one subframe, which may result in decrease of the transmission power of the equipment on the OFDM symbols of the ZP CSI-RS. For example, suppose that a ZP CSI-RS resource is configured, equivalent to transmit no signal on one subcarrier of every 6 subcarriers, which results in a decreases of 16.7% in the transmission power.

In one embodiment, in order to ensure a stable transmission power as much as possible, in the present disclosure, power boosting is performed to the PDSCH of the user in the OFDM symbols containing ZP CSI-RS.

In a first method, a power boosting proportion of the PDSCH on the OFDM symbols containing ZP CSI-RS is configured by higher layer signaling. The signaling may be transmitted with respect to each UE or transmitted to each cell via broadcast signaling. Herein, since the ZP CSI-RS may be configured on multiple different positions of the subframe, a power boosting proportion may be configured for the PDSCH on each pair of OFDM symbols which may contain the ZP CSI-RS respectively; or, a single power boosting proportion may be configured, which is applicable for the transmission of the PDSCH on all OFDM symbols which may contain the ZP CSI-RS.

In a second method, the UE calculates a PDSCH power boosting proportion on PRB resources allocated to the UE according to the ZP CSI-RS configuration. Suppose that ZP CSI-RS is configured on k subcarriers of one PRB of one OFDM symbol. When PDSCH is transmitted on the other N−k subcarriers, the power boosting proportion may be N/(N−k), wherein N is the number of subcarriers in the PRB and N=12. In one subframe, different UEs may be configured with different ZP CSI-RS, which may result in different power increases of the PDSCH.

In the above method, through the power boosting of the PDSCH on the OFDM symbols where the ZP CSI-RS is applied, the difference between transmission powers on different OFDM symbols may be reduced as much as possible. This method also has its deficiency. For example, if the ZP CSI-RS is applied to all subcarriers in one PRB of one OFDM symbol, the above method is unable to address the power difference on the OFDM symbols where the ZP CSI-RS is applied. Therefore, on the unlicensed band, it may be defined that in the frequency range of one PRB, the number of subcarriers used for ZP CSI-RS does not exceed a threshold K, so as to ensure that there is a subcarrier within the PRB on which signals are transmitted. If it is required to ensure that a subcarrier on which signals are transmitted exists in each 100 kHz, it may be defined that K is larger than or equal to 2, and the two subcarriers which are not used for ZP CSI-RS are distributed in one PRB, e.g., the index interval of the two subcarriers is 6. The value of K may be defined in advance by standards or configured by signaling or other methods.

Embodiment 6

On one channel of the unlicensed band, according to the European Regulations, the equipment shall occupy 80%~100% of the bandwidth when transmitting signals, which conflicts with the frequency resource allocation based on PRBs of the LTE system. In fact, in the LTE system, for a 20 MHz system bandwidth, the number of PRBs allocated in one subframe may vary between 0 and 100. In the LTE system, even if the lowest MCS level is considered, when 80 PRBs are allocated to the UE, the Transmission Block Size (TBS) still reaches 2216 bits. Under a particular condition, if merely a minimum TBS of 2216 bits is supported by one channel of the unlicensed band, system flexibility is restricted. According to the above analysis, under the particular condition, the LTE base station cannot transmit effective data on at least 80% bandwidth. At this time, the base station needs to transmit dummy signals so as to meet the requirement of the European Regulations.

According to the DRS structure of LTE Rel. 12, the DRS includes PSS/SSS/CRS, and may be configured to further include CSI-RS. These signals of the DRS are mapped on non-consecutive OFDM symbols. In order to prevent other equipment start from transmitting signals between the OFDM symbols where the DRS is mapped, the base station also need to transmit dummy signals to keep the channel occupied. The dummy signals may be transmitted on OFDM symbols on which no PSS/SSS/CRS/CSI-RS is mapped of the subframe containing the DRS; or, the dummy signals may also be transmitted on all OFDM symbols of the subframe containing the DRS. For the subframe containing the DRS, if no downlink data is scheduled, dummy signals may be transmitted in all PRBs or 80% of the PRBs of the whole system bandwidth. For the subframe containing the DRS, after the filling of the dummy signals, signals are transmitted on consecutive carriers of the OFDM symbols or on some subcarriers of the OFDM symbol. The subcarrier pattern for mapping the dummy signals may be configured in advance or configured by higher layer signaling.

The transmission power of the dummy signals cannot be too low; otherwise the effect of occupying the channel cannot be realized. The transmission power of the dummy signals cannot be too high; otherwise it affects the receiving of signals on effective PRBs of the UE. In the present disclosure, an Energy Per Resource Element (EPRE) of the dummy signals is lower than or equal to a minimum value of the EPRE on effective PRBs. The degree that the EPRE of the dummy signals is lower than the minimum value of the EPRE on the effective PRBs may be defined in advance, or configured by signaling or other methods, or is relevant to an implementation. Or, the EPRE of the dummy signals may be higher than the minimum value of the EPRE on the effective PRBs. But the excess is limited. The excess may be defined in advance, or configured by signaling or other methods, or is relevant to a practical application.

In the LTE system, Network Assisted Interference Cancellation and Suppression (NAICS) technique is supported to improve performance of a receiver. That is, the receiver needs to detect characteristic of the interference signals and try to eliminate the impact of the interference signals. Considering the requirement of the NAICS, the present disclosure provides a following method for designing the dummy signals.

In one PRB pair containing the dummy signals, signals are transmitted on REs of DMRS following the generation manner of the DMRS, such that the UE performing the NAICS is able to perform channel estimation based on the DMRS of the dummy signals. Herein, the sequence parameters of the DMRS of the dummy signals, e.g., cell ID and $n_{scid}$ may be defined in advance; or may be configured to the NAICS UE by higher layer signaling. For the NAICS UE, the above cell ID and $n_{scid}$ may be the same with a cell ID and $n_{scid}$ used for assisting the interference cancellation, or may be independent parameters. In other words, it is possible to add configuration information of the DMRS of the dummy signals into existing interference DMRS configuration signaling. Or, the existing interference DMRS configuration signaling may be reused, such that the base station adopts the corresponding DMRS when transmitting the dummy signals. In case that the dummy signals are configured with dedicated DMRS, the $n_{scid}$ may be an integer except for 0, 1 and 2, e.g., $n_{scid}$=3. Thus, the DMRS sequence of the dummy signals is different from that of the PDSCH and the EPDCCH.

In one PRB pair containing the dummy signals, the data REs of the PDSCH may merely adopt a QPSK modulation to obtain better NAICS performance. Herein, the QPSK modulation symbols born by each RE are random. Or, known QPSK sequences are transmitted on each RE of the PRB pair containing the dummy signals. Suppose that the PRB pair containing the dummy signals may be recognized through the DMRS detection of the PRB pair wherein the dummy signals are located, the UE may completely cancel the above known QPSK sequence, so as to further improve the performance of the NAICS. The EPRE of the DMRS of the dummy signals and the EPRE on the data REs of the dummy signals may be the same or have a fixed ratio, wherein ratio may be configured by higher layer signaling.

In one PRB pair containing the dummy signals, in order to obtain better NAICS performance, it is possible to transmit the dummy signals of a single antenna port. Suppose that the dummy signals are generated following the method based on the transmission mode of the CRS. A precoding method is adopted to transmit the dummy signals of merely one antenna port. The precoding matrix of the dummy signals may be defined in advance or configured by higher layer signaling. For the transmission mode of the CRS, the dummy signals may be transmitted according to a fixed power control parameter (PA), e.g. a minimum PA value allowed by the LTE standards, or the PA value may be defined in advance or configured by higher layer signaling. Or, the dummy signals may be transmitted using a value smaller than the minimum PA value defined by the current standards, wherein the PA value may be defined in advance or configured by higher layer signaling.

In order to improve the NAICS performance and decrease the complexity, one NAICS UE processes merely interference signals of merely one or several transmission modes. Thus, in one PRB pair containing the dummy signals, when the dummy signals are transmitted, a transmission mode that the interfered NAICS UE is able to detect and eliminate needs to be adopted to transmit the dummy signals.

In accordance with the above method, an apparatus for transmitting data is provided by the present disclosure. As shown in FIG. 9, the apparatus includes: a detecting module and an occupation module; wherein, the detecting module is adapted to perform a CCA in one channel of the unlicensed band;

the occupation module is adapted to determine whether the channel can be occupied according to a CCA measurement value in the channel, and determine data transmission parameter if the channel can be occupied.

In one embodiment, when determining the data transmission parameter, the occupation module is further adapted to: take the CCA measurement value as a first CCA threshold level, obtain a maximum transmission power allowed during a next channel occupancy time according to a relationship between the first CCA threshold level and the maximum transmission power.

In one embodiment, when determining whether the channel can be occupied, the occupation module is further adapted to: perform the operation of determining the data transmission parameter to determine the maximum transmission power if the CCA measurement value is lower than a second CCA threshold level, and do not occupy the channel if the CCA measurement value is equal to or higher than the second CCA threshold level.

In one embodiment, the detecting module is further adapted to record CCA measurement values during the CCA; and when determining the data transmission parameter, the occupation module is further adapted to: take a maximum value among N smallest CCA measurement values as the first CCA threshold value according to the CCA measurement values recorded by the detecting module, and obtain the maximum transmission power allowed during the next channel occupancy time according to the relationship between the first CCA threshold level and the maximum transmission power; or, when performing the CCA, the detecting module is further adapted to: record N smallest CCA measurement values up to present; when determining the data transmission parameter, the occupation module is further adapted to: take the maximum value among the N smallest CCA measurement values as the first CCA threshold level, and obtain the maximum transmission power allowed during the next channel occupancy time according to the relationship between the first CCA threshold level and the maximum transmission power; or, when performing the CCA, the detecting module is further adapted to: obtain the first CCA threshold level according to a required maximum transmission power, and detect the channel according to the first CCA threshold level, when the CCA check indicates that the number of times that the channel is idle reaches N, the occupation module occupies the channel.

In one embodiment, when performing the CCA, the detecting module does not record the CCA measurement value if the CCA measurement value is equal to or higher than the second CCA threshold level.

In one embodiment, the detecting module is further adapted to obtain CCA measurement values of at least two types of signals when performing the CCA;

when determining the data transmission parameter, the occupation module is further adapted to: respectively take the CCA measurement value of each type of signals as the first CCA threshold level, determine a corresponding allowed maximum transmission power according to the relationship between the first CCA threshold value and the maximum transmission power; wherein the maximum transmission power of the equipment allowed during the next channel occupancy time is a minimum value of the allowed maximum transmission powers of the at least two types of signals.

In one embodiment, the CCA measurement values of at least two types of signals include: an energy density of recognizable signals from the LTE system and an energy density of the signals from other systems; or, the CCA measurement values of the at least two types of signals include: energy of recognizable signals from an LTE system of the same operator with the LTE equipment, energy of recognizable signals from an LTE system of an operator different from the LTE equipment and energy of other signals.

In one embodiment, the allowed maximum transmission power is a maximum value of transmission powers on OFDM symbols or SCFDMA symbols during the channel occupancy time; or the allowed maximum transmission power is a maximum value of average transmission powers of subframes during the channel occupancy time; or the allowed maximum transmission power is a maximum value of an instant transmission power during the channel occupancy time.

In one embodiment, the CCA threshold level is determined according to the type of signals to be transmitted in the channel, if the CCA measurement value is lower than the CCA threshold value, the equipment occupies the channel to transmit the signals of the type.

In one embodiment, the transmission power on each OFDM symbol is unchanged or decrease with time during the channel occupancy time.

In one embodiment, the difference between transmission powers on different OFDM symbols of one subframe is within a predefined range.

In one embodiment, during one channel occupancy time, the difference between the transmission powers on different OFDM symbols is within a predefined range; or during one channel occupancy time, the difference between the transmission powers on different OFDM symbols in a subframe is within a first range, and the difference between average transmission powers of different subframes is within a second range.

In one embodiment, the occupation module is further adapted to obtain a power boosting proportion of a Physical Downlink Shared Channel (PDSCH) on OFDM symbols containing Zero power Channel State Indication-Reference Signal (ZP CSI-RS) according to higher layer signaling; or the occupation module is further adapted to calculate a power boosting proportion of the PDSCH on PRBs allocated to the apparatus according to the configuration of ZP CSI-RS.

In one embodiment, the apparatus further transmits dummy signals.

In one embodiment, the EPRE of the dummy signals are is equal to or lower than a minimum value of the EPRE on effective PRBs.

In one embodiment, in one PRB pair containing the dummy signals, the DMRS sequence is defined in advance, or is configured to the NAICS UE via higher layer signaling.

In one embodiment, if dedicated DMRS is configured for the dummy signals, $n_{scid}$ is equal to an integer except for 0, 1, and 2.

In one embodiment, in one PRB pair containing the dummy signals, a QPSK modulation manner is adopted on data REs of the PDSCH, and the QPSK modulation symbol born by each RE is random; or a known QPSK sequence is transmitted on each RE of the PRB pair.

In one embodiment, in one PRB pair containing the dummy signals, dummy signals of a single antenna port are transmitted.

In one embodiment, for a transmission mode based on the CRS, a precoding matrix of the dummy signals is defined in advance or configured by higher layer signaling.

In one embodiment, for the transmission mode based on the CRS, the dummy signals are transmitted using a minimum power control parameter PA, wherein the PA is defined in advance or configured by higher layer signaling.

The foregoing descriptions are only preferred embodiments of this disclosure and are not for use in limiting the protection scope thereof. Any changes and modifications can be made by those skilled in the art without departing from the spirit of this disclosure and therefore should be covered within the protection scope as set by the appended claims.

The invention claimed is:

1. A method for transmitting data, comprising:
performing, by a base station, a clear channel assessment (CCA) in a channel of an unlicensed band;
determining, by the base station, whether the channel is occupied in a first time period according to a CCA measurement value in the channel; and
determining, by the base station, a transmission power allowed during a second time period occupied by the channel according to a relationship between the CCA measurement value and a maximum transmission power,
wherein the second time period is next to the first time period.

2. The method of claim 1,
wherein the allowed transmission power is determined by comparing the CCA measurement value with a CCA threshold level.

3. The method of claim 1, wherein the performing the CCA further comprises:
performing, by the base station, a CCA check; and
recording, by the base station, CCA measurement values, and
wherein the determining of the transmission power allowed during the second time period occupied by the channel comprises:
obtaining a maximum value among N smallest CCA measurement values as a first CCA threshold level according to the recorded CCA measurement values; and
determining the transmission power allowed during the second time period according to a relationship between the first CCA threshold level and the maximum transmission power.

4. The method of claim 1, further comprising:
detecting CCA measurement values of at least two types of signals,
obtaining the CCA measurement values of the at least two types of signals as a first CCA threshold levels, and
determining allowed transmission powers according to a relationship between the first CCA threshold levels and the maximum transmission power,
wherein the maximum transmission power is a minimum value of the allowed transmission powers of the at least two types of signals.

5. The method of claim 4, wherein the CCA measurement values of the at least two types of signals comprise:
an energy density of recognizable signals from an communication system and an energy density of other signals; or
energy of recognizable signals from a communication system of a first operator of the base station, energy of recognizable signals from a communication system of a second operator different from the first operator, and energy of other signals.

6. The method of claim 1, wherein the allowed maximum transmission power comprises,
a maximum value of transmission powers on orthogonal frequency division multiplexing (OFDM) symbols or single carrier frequency division multiple access (SCFDMA) symbols in the second time period; or
a maximum value of average transmission powers of subframes in the channel second time period; or
a maximum value of an instant transmission power in the second time period.

7. The method of claim 6,
wherein the transmission power on each OFDM symbol is unchanged or decreases with time, in one channel occupancy time; or
wherein the average transmission power of each subframe is unchanged or decreases with time, in one channel occupancy time.

8. The method of claim 7, wherein the transmission powers on OFDM symbols in one subframe have a difference within a configured first range.

9. The method of claim 7, wherein the average transmission powers of subframes have a difference within a configured second range.

10. The method of claim 1, further comprising:
if the CCA measurement value is lower than a CCA threshold value, occupying, by the base station, the channel to transmit a signals of a type, wherein the CCA threshold level is determined according to the type of the signal to be transmitted in the channel.

11. The method of claim 1, further comprising:
obtaining a power boosting proportion of a physical downlink shared channel (PDSCH) in OFDM symbols containing zero power channel state indication-reference signal (ZP CSI-RS) according to a configuration of higher layer signaling.

12. The method of claim 1, further comprising:
transmitting, by the base station, dummy signals.

13. A base station for transmitting data, comprising:
a transmitter configured to transmit the data; and
at least one processor configured to:
perform a clear channel assessment (CCA) in a channel of an unlicensed band,
determine whether the channel is occupied in a first time period according to a CCA measurement value in the channel, and
determine a transmission power allowed during a second time period occupied by the channel according to a relationship between the CCA measurement value and a maximum transmission power,
wherein the second time period is next to the first time period.

14. The base station of claim 13,
wherein the allowed transmission power is determined by comparing the CCA measurement value with a CCA threshold level.

15. The base station of claim 13,
wherein the at least one processor is further configured to:
perform a CCA check, and record the CCA measurement values, and
obtain a maximum value among N smallest CCA measurement values as a first CCA threshold level according to the recorded CCA measurement values, and
determine the transmission power allowed during the second time period according to a relationship between the first CCA threshold level and the maximum transmission power.

16. The base station of claim 13, wherein the at least one processor is further configured to:
   detect CCA measurement values of at least two types of signals, and
   obtain the CCA measurement values of the at least two types of signals as first CCA threshold levels, and determine allowed transmission powers according to a relationship between the first CCA threshold levels and the maximum transmission power, and
   wherein the maximum transmission power is a minimum value of the allowed transmission powers of the at least two types of signals.

* * * * *